United States Patent [19]

Hodges

[11] 4,402,352
[45] Sep. 6, 1983

[54] STUMP CUTTING MACHINE

[76] Inventor: Hubert E. Hodges, Rte. 6, Box 155, Mountain Home, Ark. 72653

[21] Appl. No.: 382,158

[22] Filed: May 26, 1982

[51] Int. Cl.³ ............................................. A01G 23/06
[52] U.S. Cl. ...................................... 144/2 N; 37/2 R; 56/17.1
[58] Field of Search ................ 83/928; 30/379, 379 S; 37/2 R; 56/17.1, 119; 144/2 N; 299/72–78

[56] References Cited

U.S. PATENT DOCUMENTS

| | | | |
|---|---|---|---|
| 3,004,568 | 10/1961 | Wachtel | 144/2 N |
| 3,308,860 | 3/1967 | Shano | 144/2 N |
| 3,485,314 | 12/1969 | Herr | 280/415 R |

*Primary Examiner*—W. D. Bray
*Attorney, Agent, or Firm*—Stephen D. Carver

[57] ABSTRACT

A self-propelled stump cutting machine including a forwardly projecting, front mounted cutter assembly controlled by a pivoted, rear mounted handle assembly. The machine comprises a rigid frame to which a pair of spaced-apart drive wheels are rotatably coupled. A motor pivotally secured to the frame and linked to an intermediate transaxle to selectively drive the wheels, also provides power for the cutter assembly. The handle assembly pivot connection is operatively elevated above ground a desired amount by a dolly wheel assembly which is also pivotably secured to the frame. The operating point is established by selectively securing the handle assembly relative to the dolly wheel assembly. When the handles are pushed downwardly by the operator, the remote cutter assembly will similarly move downwardly into engagement with a stump to be removed.

6 Claims, 12 Drawing Figures

STUMP CUTTING MACHINE

BACKGROUND OF THE INVENTION

The present invention relates generally to a stump cutting apparatus. More particularly, the present invention is directed to a self-propelled stump cutting device including a forwardly projecting cutter assembly controlled by a rear mounted pivoted handle assembly.

In the prior art a variety of attempts have been formulated for removing or cutting stumps. All prior art attempts known to me share various common elements. For example, most devices include some form of elongated, rigid frame which is supported above ground by two or more wheels. Some form of rotatable, cutter blade is employed to engage the stump to be removed. Many of the prior art devices are extremely heavy and complicated. For example, it is known to provide cutter assembly actuation by remote hydraulically operated linkage, which, in response to operator movement of suitable hydraulic valves, moves the cutter into or out of engagement with the stump to be removed. Other designs disclose stump cutters which are essentially manually controlled and moved about by the operator. The most common prior art devices of the latter nature include a cutter wheel assembly disposed generally toward the rear of the apparatus adjacent the control handles. In the latter case the cutter wheel is lowered into engagement with the stump to be removed simply by lowering the handles of the device. In other words in such devices the cutter wheel is pivoted with respect to the axle of the support wheels.

Manual, one man stump cutters may include a front mounted cutter wheel which is pivoted downwardly into engagement with the stump by lifting up on rear handles. A safety advantage of such designs is that the operator is positioned further from the cutter wheel. However, a disadvantage is that the operator must lift upwardly on the rear handles to engage the stump by using his arms and chest muscles. In the repetitive applications required in operating stump cutters, I have found that operator fatigue is minimized when use of arm and chest muscles is limited to a downward or pushing direction, rather than to an upward or lifting direction.

U.S. Pat. No. 3,783,914 discloses a one man stump cutter which includes a downwardly projecting cutter wheel disposed between the front support wheels and the rear handles. The latter patent is similar to my U.S. Pat. No. 3,123,112 issued Mar. 3, 1964. In the patent I disclosed a one man stump cutter in which a motor is disposed upon an elongaged frame between front mounted wheels and a rear mounted stump cutter assembly.

Carlton U.S. Pat. No. 3,336,958 issued Aug. 22, 1967 discloses a one man machine in which a front mounted cutter wheel assembly is moved downwardly into engagement with a stump when an operator lifts up on the rear mounted handles. The drive wheels of the device provide the pivot point. Other examples of "front mounted" cutter assemblies may be seen in U.S. Pat. Nos. 4,271,879; 3,568,740; 4,074,447; Re. 28,651; and 3,625,267. Some of the latter devices disclose stump cutting machines in which a variety of hydraulic and other complex linkages are provided for controlling the rotating cutter blade assembly. However, a significant disadvantage with some of these machines is that they must be towed into operation by some form of tractor, truck or the like.

SUMMARY OF THE INVENTION

The present invention comprises a self-propelled stump cutting machine which may be operated successfully by a single operator from a position remote from forwardly projecting cutting apparatus.

Preferably the machine comprises a rigid, elongated frame formed of spaced-apart channels or the like. The frame is supported above ground by a pair of drive wheels which are rotatably coupled thereto. A motor, preferably an internal combustion engine, is pivotally secured to the frame for providing power, and is coupled to the drive wheels through a conventional transaxle assembly. A cutter wheel assembly, including an elongated boom which projects outwardly from the frame front, may be selectively coupled to the motor to treat a desired stump. The cutter wheel assembly is actuated by elongated V-belts extending between the motor and the rotatable cutter. An engine rocking lever may be pushed forward to tilt the engine and hence tighten the cutter drive belts to treat the stump. Belts coupled between the engine and the transaxle will be tightened when an idler pulley of conventional design is suitably actuated, whereby the machine will be self-propelled in the selected direction.

The apparatus is controlled by one man who grasps a rearwardly mounted handle assembly. The handle assembly is pivotably coupled to the frame. Importantly, through the structure disclosed, the handles may be pushed downwardly by an operator whereby to force the forwardly projecting remote cutter wheel assembly into engagement with the stump to be removed. Thus, unlike prior art designs, normal operation does not require constant lifting by the operator.

A dolly wheel assembly also pivotably coupled to the frame at the rear thereof is employed to establish an operating point. Means are provided to secure the handle assembly relative to the dolly assembly, such that the cutter wheel assembly will be initially positioned at a particular operating point. Afterwards, when the handles are pushed downwardly, the stump may be treated. When treatment is virtually completed, the handles will be in an extreme downward position. At this time a locking mechanism associated with the handles may be activated, so that subsequent lifting of the handles will pivot the cutter wheel further downwardly into the stump.

Thus a broad object of the present invention is to provide a self-propelled stump cutter which may easily be operated by one person.

More particularly, it is an object of the present invention to minimize operator fatigue experienced in conjunction with the operation of stump cutters.

Another object of this invention is to provide a system which enables the operator of a one man, self-propelled stump cutter to force the cutter wheel assembly down into engagement with the stump to be removed simply by pushing downwardly on the remote handles.

Another object is to provide a stump cutting machine which may be easily handled and maneuvered by one man, which at the same time will maximize operator safety.

Yet another object of the present invention is to provide a stump cutting machine of the character described which is inherently versatile. It is an important feature of the present invention that the initial operating point may be selected by securing the handle assembly relative to the dolly wheel assembly. Moreover, when the stump is substantially cut, the handle assembly may be secured to the frame, permitting further cutting of the stump by upward lifting of the handle assembly.

A similar object of the present invention is to provide one man, self-propelled stump cutting apparatus in which the cutter wheel assembly is positioned as far as possible from the operator.

A related object is to minimize operator fatigue and discomfort.

These and other objects and advantages of the invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in various views.

DETAILED DESCRIPTION OF THE DRAWINGS

Figure 1:
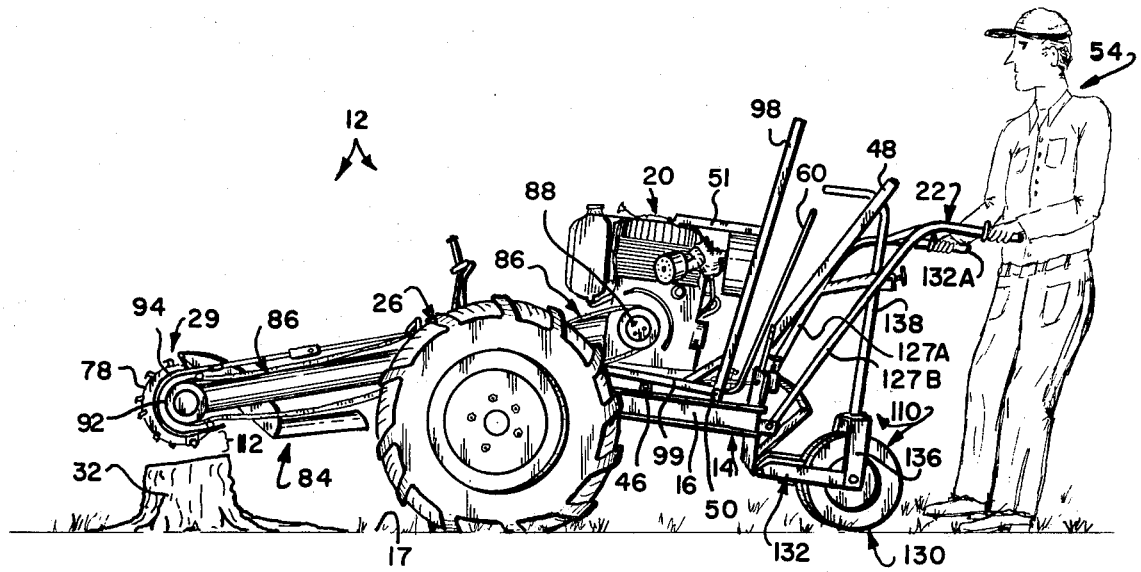
FIG. 1 is a side elevational view of a stump cutter constructed in accordance with the teachings of the present invention, illustrating the machine positioned appropriately to subsequently engage and cut a stump to be treated.

With reference now to the drawings, a self-propelled stump cutting machine constructed in accordance with the teachings of the present invention has been generally designated by the reference numeral 12. Machine 12 comprises a rigid, generally elongated frame, generally designated by the reference numeral 14, which preferably comprises a pair of spaced-apart rigid channel members 16 and 18. A motor, preferably an internal combustion engine, generally designated by the reference numeral 20, is pivotally mounted upon frame 14 between a rear handle assembly, generally designated by the reference numeral 22, and the drive wheels, generally designated by the reference numerals 24 and 26. A cutter wheel assembly, generally designated by the reference numeral 29 projects outwardly from the front 30 of the frame for cutting a stump 32 to be removed. Motor 20 may be controlled by the operator 54 to propel machine 12 over ground 17 to a desired location.

Wheels 24, 26 are coupled to an intermediate transaxle, generally designated by the reference numeral 34, by axle members 24A, 26A respectively which are journaled through frame 18. Motor 20 preferably comprises a 16 horsepower Kohler engine, available from the Kohler company, in Kohler, Wis. The gear box 34 comprises a commercial, conventional transaxle available from Peerless Gear and Machine, in Clinton, Mich. Preferably the gear box is a Peerless transaxle, model 1204A.

Figure 2:
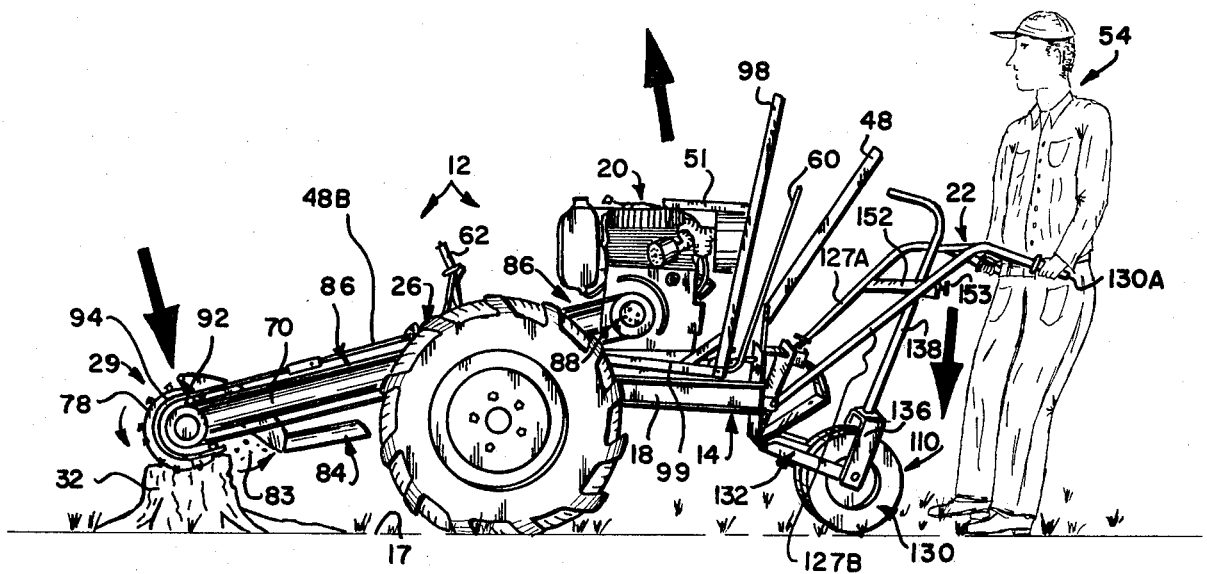
FIG. 2 is an elevational view similar to FIG. 1, but illustrating actual operation of the cutter.
Figure 4:
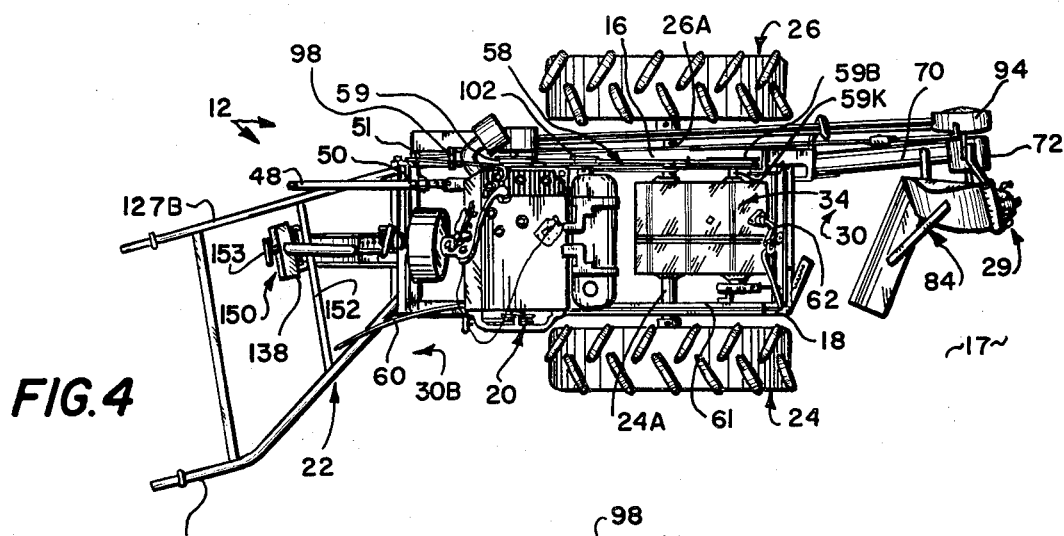
FIG. 4 is a top plan view of the stump cutter.
Figure 5:
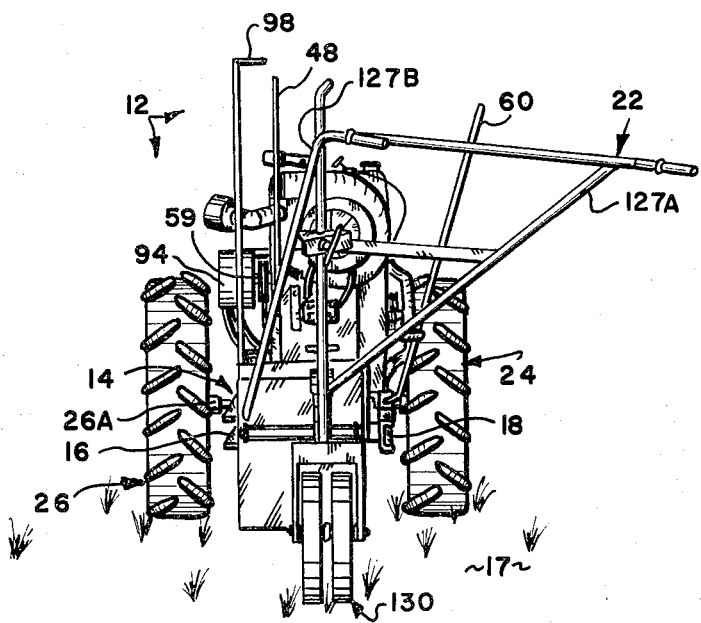
FIG. 5 is a rear elevation view thereof.
Figure 7:
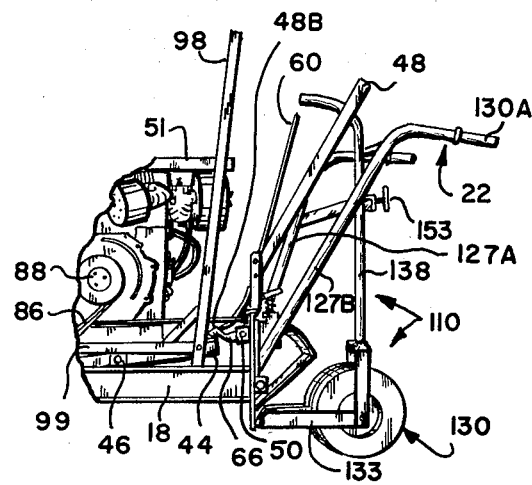
FIG. 7 is a fragmentary, rear elevational view of the cutter illustrating the handle assembly and the dolly wheel assembly.
Figure 8:
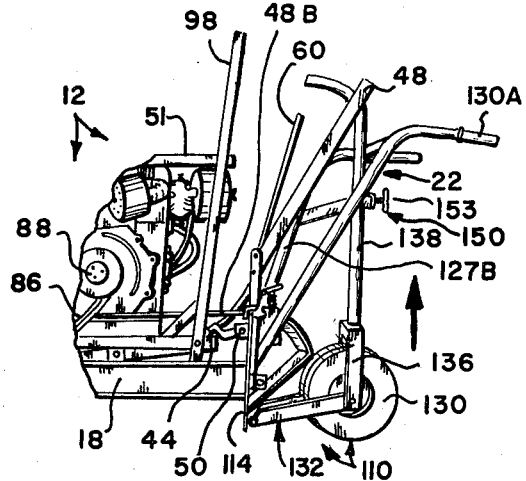
FIG. 8 is a view similar to FIG. 7, but illustrating the dolly wheel assembly in a moved position.
Figure 9:
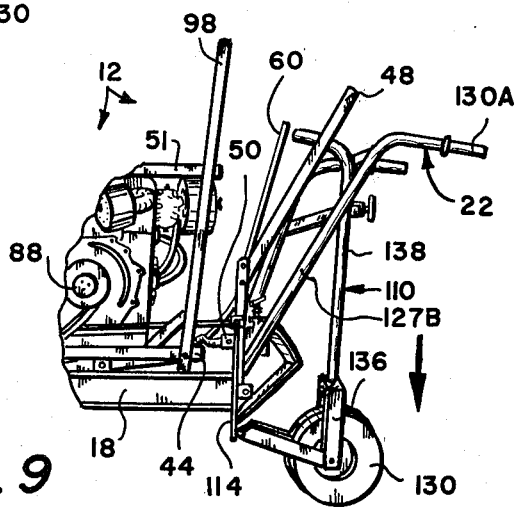
FIG. 9 is a view similar to FIGS. 7 and 8, but illustrating the dolly wheel assembly moved downwardly from those positions formerly illustrated.

Motor 20 rides upon a shelf 44 (FIGS. 10, 11) which is pivotably coupled to the frame, as indicated at 46 (FIG. 7). An upwardly extending motor tilt lever 48 pivotally secured to the frame at 50 (FIGS. 7, 8) may be pushed forwardly by operator 54 to conventionally tilt engine 20, and hence tighten cutter assembly drive belts 86 (FIGS. 1, 4). Belts 86 are trained over engine pulley 88 and cutter drive pulley 92. When belts 86 are thus tightened by lever 48, the cutter assembly will be actuated. Lever 48 tilts motor 20 via a foot portion 66 which contacts motor shelf 44. When the cutter is thus actuated, lever 48 may be releasably, temporarily secured in an operative position by generally arcuate latch 51. When moved forwardly, lever 48 also thrusts rod 48B forwardly to release conventional cutter wheel brake 94. (FIGS. 2, 7, 8).

Figure 12:
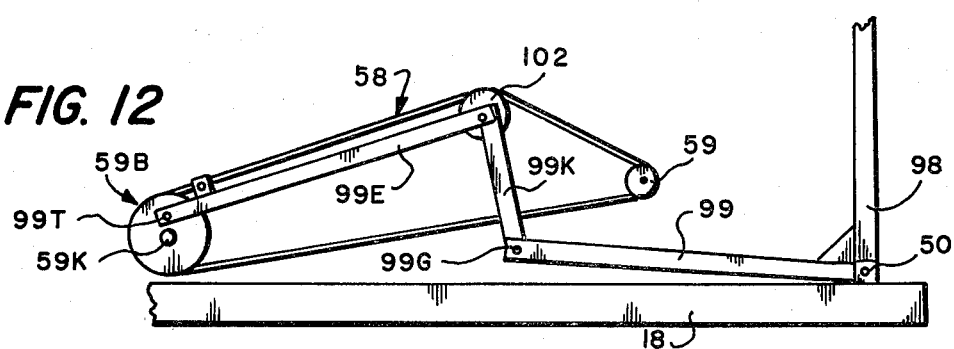

With reference now to FIGS. 4 and 12, the transaxle 34, and hence drive wheels 24, 26, are operated by a control lever 98 which drives an elongated link 99 forwardly to tension transmission belts 58. Belts 58 are trained over engine drive pulley 59, transaxle input pulley 59B (keyed to axle 59K), and idler pulley 102. The belts 58 are tightened when link 99 actuates the idler pulley 102, nominally a conventional Faffner or SKF unit. A rearward pull of lever 98 actuates the transaxle by deflecting link 99K upwardly. Link 99K pivotally mounts pulley 102, and is coupled at 99G to link 99. Link 99E is pivoted to link 99K, and to the frame at 99T. Gear shift lever 60 is linked to transaxle 34 via extension 61 which is coupled to gear change link 62 associated with transaxle 34. As viewed by operator 54, a forward and then leftward push of lever 60 puts the transaxle in "reverse"; a forward then right angled push puts it in "forward".

Figure 6:
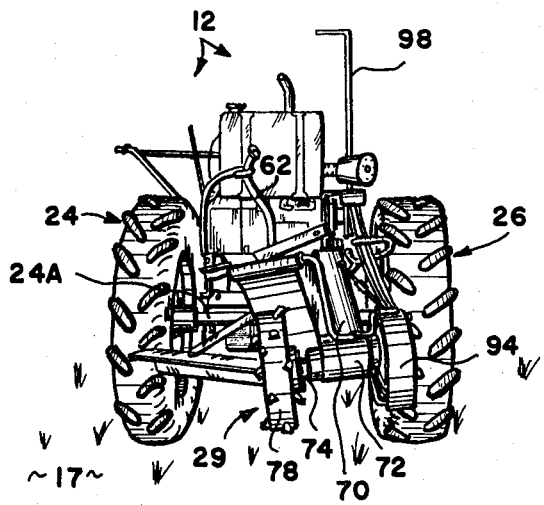
FIG. 6 is a reduced scale, front elevational view thereof.

The cutter wheel assembly 29 comprises an elongated boom 70 of rigid construction which extends forwardly from the front 30 of the frame, being secured to frame side rail 18. Boom 70 terminates in a transverse mandrel 72 (FIG. 6) through which an axle 74 extends. Axle 74 terminates in a circular, toothed cutter wheel 78 including a plurality of radial spaced-apart teeth 79. A generally arcuate protective shroud assembly, generally designated by the reference numeral 84, is positioned over cutter wheel 78 to prevent flying debris 83 (FIG. 2) from reaching the operator. As mentioned, cutter wheel drive belts 86 must be tightened by pushing lever 48 forwardly. Cutter pulley 92 is released when brake 94 is disengaged by rod 48B in response to movement of lever 48.

As mentioned previously, the handle assembly 22 may be pressed downwardly by the operator 54 to pivot the cutter wheel 78 downwardly into engagement with the stump 32 to be treated. The handle assembly 22 is employed in conjunction with an associated dolly wheel assembly generally designated by the reference numeral 110. Dolly wheel assembly 110 establishes an operational pivot point for subsequent use of the machine 12. For example, the distance generally designated by the reference numeral 112 (FIG. 1) initially set up between the bottom of blade 78 and the stump 32 may be established by adjustment of the handle assembly 22 relative to the dolly wheel assembly 110, as will hereinafter be described.

With primary reference now to FIGS. 7–11, frame 14 terminates at its rear in a transverse, rigid plate 114 from which a pair of rigid, spaced-apart tabs 116 and 118 outwardly project. A pivot axle 119 extends between these tabs 116, 118 coaxially within an elongated sleeve 120. Sleeve 120 is welded to a handle plate 124 to which upwardly angularly inclined handle members 127A and 127B are secured. The handle grip portions 130A and 132A may be conveniently manually grasped by operator 54. As most clearly depicted in FIGS. 10 and 11, the handle assembly 22 may thus be pivoted with respect to the frame 14, since handle plate 124 is pivotally displaceable with respect to frame plate 114.

Figure 3:
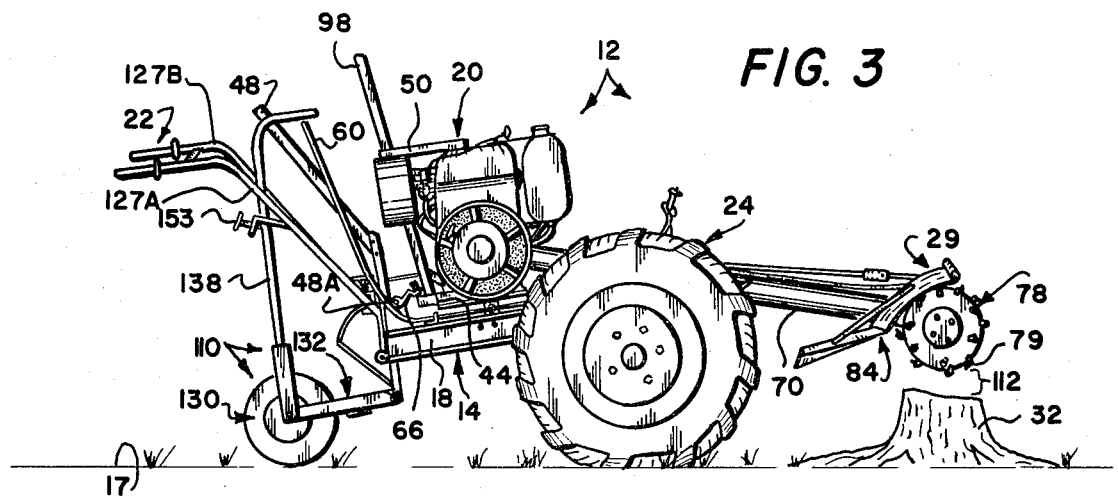
FIG. 3 is an elevational view of the stump cutter illustrating an opposite side from that shown in FIGS. 1 or 2.
Figure 10:
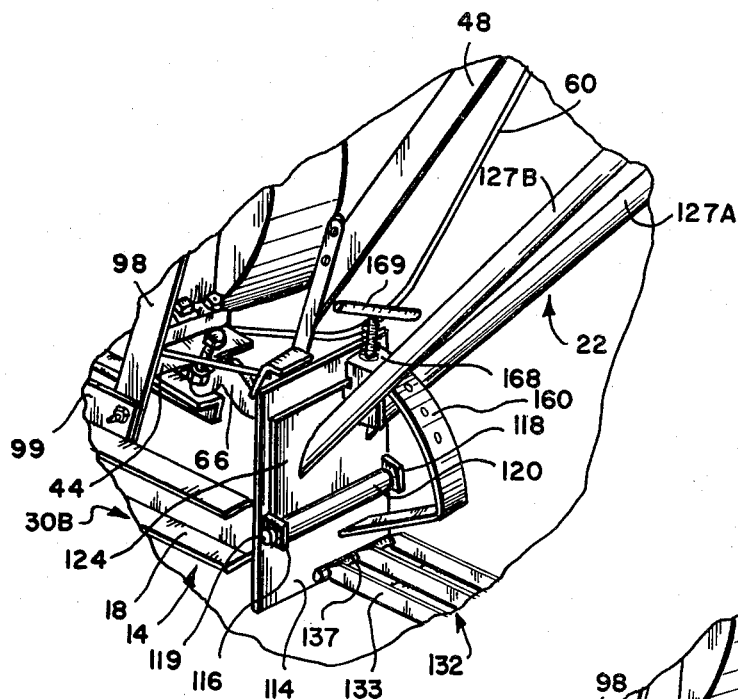
FIG. 10 is an enlarged, fragmentary isometric view of the handle assembly pivoting system.
Figure 11:
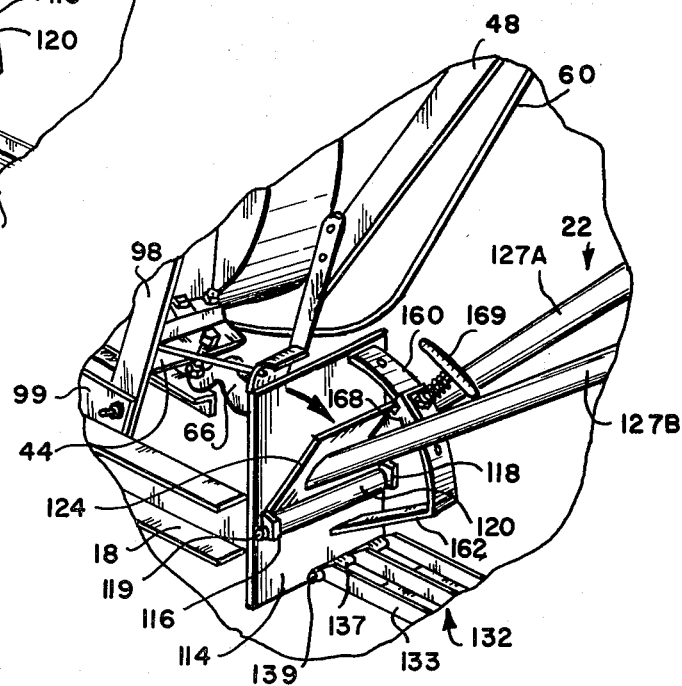
FIG. 11 is a view similar to FIG. 10, but illustrating the handle assembly in a moved position; and, FIG. 12 is an enlarged schematic view of the transmission belt and idler assembly.

The dolly wheel assembly 110 includes a plurality of dolly wheels 130 secured between generally horizontal strut members 132, comprising a plurality of individual struts 133 arranged in generally parallel, spaced apart relation. These struts terminate in a sleeve 137 which receives pivot axle 139 and is welded to plate 114, to thereby pivot the dolly wheel strut assembly 132 with respect to the frame 14. The dolly wheel assembly 110 also includes a brace 136 (FIGS. 8-9) coupled about wheels 130 and extending generally vertically upwardly therefrom, terminating in an elongated generally vertically oriented stanchion 138. As best viewed in FIG. 4, stanchion 138 is received through a locking mechanism, generally designated by the reference numeral 150, which is secured to handle cross piece 152. Locking mechanism 150 includes a manual screw lock 153 which secures the handle assembly 22 in the desired position relative to the dolly wheel assembly 110. As should be appreciated from a comparison of FIGS. 1 and 2, downward displacement of the handle assembly 22 (once lock 153 is set) will thus pivot the cutter assembly 29 downwardly over wheels 24, 26. At this time the rear 30B of frame 14 will be elevated upwardly. The handles are pivoted by an axle 119 (FIGS. 4, 10, 11). To initiate operation, the lock 153 may be undone to orient the handle assembly 22 in a position such that distance 112 (FIGS. 1, 3) is appropriate. Afterwards the entire assembly will be pivoted as described in response to handle manipulation. Of course, as the rear 30B of frame 14 is forced upwardly, the cutter assembly 29 will pivot downwardly, pivoting occuring over the axle of the drive wheels.

As best illustrated in FIGS. 10, 11 a generally arcuate, rigid guide 160 projects from the top of plate 114, terminating in a lower brace 162 which is secured to the bottom of plate 114. A rigid follower 168 secured to plate 124 between handle members 127A, 127B tracks about guide 160. Follower 168 includes a lock 169, which, when appropriately tightened by the operator 54 will engage guide 160 and rigidly secure the handle assembly 22 relative to the machine 12. At this time the operator 54 may then lift upwardly on the handle assembly causing the cutting wheel assembly 29 to move even further downwardly into the stump 32 to be cut, being pivoted with respect to the wheels 24, 26.

Operation

When the machine 12 is to be started the cutter wheel assembly 29 should be disengaged. Thus engine tilt lever 48 will be disengaged from latch 51 causing cutter wheel belts 86 to relax (FIG. 1). Also, the transaxle activating lever 98 should be in the rest position, so as to prevent rotation of drive wheels 24 or 26. Once motor 20 is appropriately started, and a desired throttle position is set, the entire machine 12 may be moved by the operator from his truck or other vehicle into the area to be treated.

Gear lever 60 should be pushed forward and to the left to put the transaxle 34 in reverse; it may be pushed forward and to the right to put the transmission in forward gear. When the gear is selected, lever 98 may be moved rearwardly to activate the drive wheels, and the machine can be moved into the desired position relative to the stump 32. Prior to engaging a stump the offset distance 112 should be selected; for this purpose locking mechanism 150, which secures the handle assembly 22 relative to the dolly wheel assembly 110, should be activated. During this adjustment the follower lock 169 should be loosened.

Once the stump is reached, the operator need merely push down on handle assembly 22 to pivot the cutter assembly wheel 78 into stump 32 (FIG. 2). As he continues to work the pivoting limits of the handle assembly 22 will eventually be reached. Usually in this position the follower lock 169 (FIG. 11) will be nearly at the bottom of guide 160. At this point this lock should be tightened, so the operator 54 may subsequently lift upwardly on handle assembly 22 to further pivot the cutter wheel 78 into the stump 32. When a stump is comletely removed, the machine may similarly be guided to an adjacent stump to be treated.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A self-propelled stump cuttting machine comprising;
   rigid frame means having a front and a rear;
   drive wheel means rotatably coupled to the frame means for propelling and supporting the machine;
   motor means secured to said frame means for providing operative power;
   cutter means projecting outwardly from the frame front for engaging and cutting a stump;
   means coupled to said motor means for selectively activating said cutter means;
   gear box means coupled to said motor means for selectively activating said drive wheel means;
   handle assembly means pivotally coupled to said frame means at the rear thereof and establishing a pivot point, said handle assembly means adapted to be manually grasped by an operator of said machine and operable, when pushed down relative to said frame means, to tilt said cutter wheel means downwardly into engagement with a stump to be treated.

2. The combination as defined in claim 1 including dolly wheel assembly means pivotally coupled to said frame means at the rear thereof for raising or lowering said pivot point whereby to set up said machine for subsequent engagement with stumps of varying heights.

3. The combination as defined in claim 2 wherein:
said dolly wheel assembly means comprises:
dolly wheels adapted to roll upon the ground;
generally horizontal strut means rotatably mounting said dolly wheels and pivotally secured to said frame means; and,
generally vertically oriented stanchion means extending upwardly from said dolly wheels; and,
said handle assembly means including means adapted to be locked to said vertically oriented dolly wheel stanchion means to select a desired operating point.

4. The combination as defined in claim 2 including:
guide means rigidly projecting from the rear of said frame means;
follower means rigidly associated with said handle assembly means in tracking relation with respect to said guide means; and,
lock means coupled to said follower means for selectively securing said handle assembly means relative to said frame means, whereby to enable an operator of said machine to further cut a stump by lifting up on said handle assembly means to pivot the cutter means further downwardly into said stump.

5. The combination as defined in claim 3 including:
guide means rigidly projecting from the rear of said frame means;
follower means rigidly associated with said handle assembly means in tracking relation with respect to said guide means; and,
lock means coupled to said follower means for selectively securing said handle assembly means relative to said frame means, whereby to enable an operator of said machine to further cut a stump by lifting up on said handle assembly means to pivot the cutter means further downwardly into said stump.

6. The combination as defined in claim 5 wherein said motor is pivotally mounted with respect to said frame, said means coupled to said motor means for selectively activating said cutter means comprises belt means, and said machine includes motor rocking means to tighten said belt means to activate said cutter means.

* * * * *